May 12, 1970 NORIO YOKOZAWA ET AL 3,512,140

SAMPLE AND HOLD SYSTEM

Filed Feb. 14, 1968 4 Sheets-Sheet 1

INVENTORS
NORIO YOKOZAWA
CHIKAFUSA HIRANO

BY Craig e Antonelli
ATTORNEYS

INVENTORS
NORIO YOKOZAWA
CHIKAFUSA HIRANO

BY Craig & Antonelli
ATTORNEYS

FIG. 8
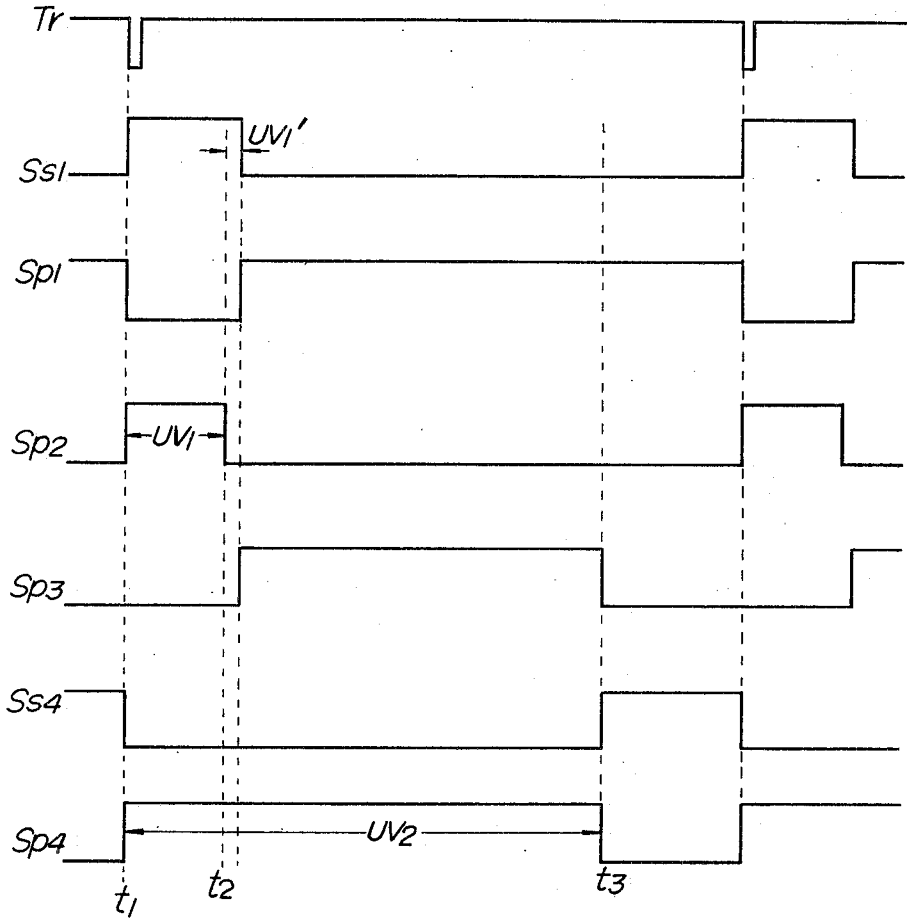
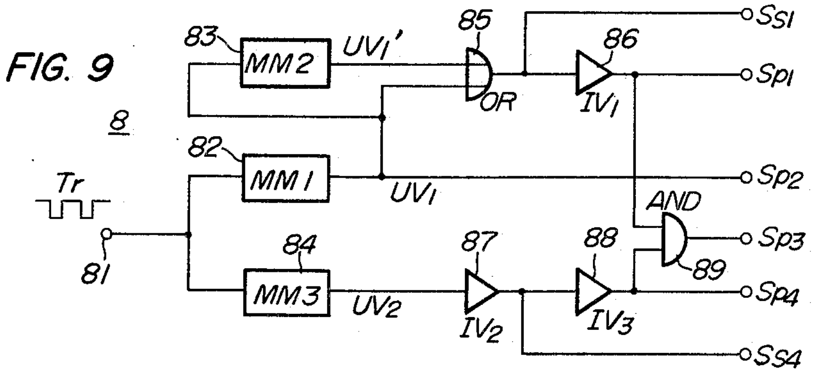
INVENTORS
NORIO YOKOZAWA
CHIKAFUSA HIRANO
BY Craig & Antonelli
ATTORNEYS

SAMPLE AND HOLD SYSTEM

Filed Feb. 14, 1968

INVENTORS
NORIO YOKOZAWA
CHIKAFUSA HIRANO

BY Craig & Antonelli
ATTORNEYS

United States Patent Office 3,512,140

Patented May 12, 1970

3,512,140
SAMPLE AND HOLD SYSTEM

Norio Yokozawa, Fuchu-shi, and Chikafusa Hirano, Kodaira-shi, Japan, assignors to Hitachi, Ltd., Tokyo, Japan, a corporation of Japan Filed Feb. 14, 1968, Ser. No. 705,354
Claims priority, application Japan, Feb. 15, 1967, 42/9,207
Int. Cl. H03k *5/00, 17/00;* G11c *11/24*
U.S. Cl. 340—173 3 Claims

ABSTRACT OF THE DISCLOSURE

An improvement in the sample and hold system of the capacitor type used in analog computers or the like. The improvement has been made by providing an additional capacitor or capacitors and electronic switch means which change connections of the capacitors between a sample time and a hold time. Thus, an improved sample and hold system of shorter sample time and longer hold time can be obtained.

Background of the invention

This invention relates to a sample and hold system of improved characteristics.

Among the various memory elements used in analog systems, the ones utilizing capacitors have advantages in the easiness of selecting an appropriate accuracy and speed in design of the system. For this reason, the capacitor memory elements are commonly used in memory elements for analog computers or hybrid computers and the sample and hold systems. The desirable property of a sample and hold system is to sample momentarily an input signal and to hold the sampled value accurately. In an actual system, however, the momentary sampling of an input signal is not attained because of the limited current capacity in the electronic switches and the other parts of the system, nor the accurate and prolonged holding of the sampled value because of leakage of the electric current in the capacitors and the remaining parts of the system.

A known sample and hold system that is nearest to the present invention is the U.S. Pat. 3,249,925 entitled "Sample and Hold System" assigned to Beckman Instruments Inc. by Charles H. Single, John A. Brussolo and Edward M. Billinghust. This prior art could operate with a much shorter sample time than that of the other conventional systems. However, it was the same as the conventional systems in the operation during the hold periods, a prolonged holding being impossible. The abovementioned known system by Charles H. Single et al. (hereafter, referred to as said known system) will be analyzed hereunder as to its disadvantageous aspects in comparison with the present invention. Details of the operation of said known system will not be described here, as it can be known from said U.S. patent specification.

FIG. 1 is a schematic connection diagram of said known system. Input signal $e_1$ is applied to input terminal O1. The values of input resistor O2 and feedback resistor O3 are assumed to be $R_1'$ and $R_2'$ respectively, and static capacitance of sample hold capacitor O5 to be C. An operational amplifier is indicated by the numeral O4. Switches O61, O62 and O63 are controlled by signals $S_1$, $S_2$ and $S_3$ respectively. Output signal $e_0$ appears at output terminal O7. The control signals $S_1$, $S_2$ and $S_3$ will be explained in a later paragraph in connection with the description of this invention.

In this arrangement, the switches O61 and O63 are turned to on during a sampling period, while the switch O62 is turned to off, thus storing the input signal $e_1$ into the capacitor O5. It will be noted that if $R_1'$ is not equal to $R_2'$, the output signal will not be the same in value as the input signal $e_1$, the former being $$\frac{R'_2}{R'_1} \cdot e_1$$

During a holding period, the switches O61 and O63 are turned to off while the switch O62 is turned to on, and thereby the accumulated voltage is held.

Now, defining that the maximum voltage stored in the capacitor is E and the maximum charging current during a sampling period is $I_0$, and further that the voltage level of the input signal changes from the minimum level of −E to the maximum level of +E; then the approximate sampling time will be determined by the following formula (though an actual sampling time is slightly longer).

$$T_s = \frac{2CE}{I_0} \tag{1}$$

Thus, the electric current in the sample system will saturate (the value depends on the current capacity of the electronic switch) when the above-mentioned maximum voltage has been applied to the system, thereby causing a substantially constant current $I_0$ to flow in the system. Therefore, a sample system in saturated state can be deemed a constant current source. The constant current $I_0$ continues to charge the capacitor so as to increase the voltage of the capacitor toward the input voltage +E. Meanwhile, the sample system varies from the saturated state to an unsaturated state, the constant current source changing gradually to a constant voltage source. The constant voltage state continues until the capacitor is charged to the maximum voltage +E. A sample time, that is, a period necessary for the capacitor to be charged to the input voltage, should be the total of the charging time in the saturated state and the unsaturated state in the strict meaning of the word. However, since the unsaturated state starts when the voltage has almost reached the highest value, it can be considered in practical handling that the sample time ends with the end of the saturated state.

Next, the hold time will be discussed. If it is defined that the leakage electric current during the hold time (memory holding period) is $I_1$ and the allowable variation in the voltage at the capacitor (i.e., maximum negligible difference between the output voltage at the start of hold and that after a certain period of hold) is ΔE, then the hold time $T_H$ is determined as follows.

$$T_H = \frac{C\Delta E}{I_1} \tag{2}$$

In the formulas (1 and 2, the current $I_0$ is determined from the current capacity of the system, and the leakage current $I_1$ has a limited value. The ratio of $T_H$ and $T_S$ is defined as the property number of the sample and hold system.

$$\frac{T_H}{T_S} = \frac{I_0}{I_1} \cdot \frac{\Delta E}{2E} \tag{3}$$

For example, when $I_0 = 50$ ma., $I_1 = 5 \times 10^{-11}$A. $\Delta E/E = 10^{-3}$(i.e., 0.1%), $$\frac{T_H}{T_S} = \frac{5\times10^{-3}}{5\times10^{-11}} \cdot \frac{10^{-3}}{2} = 5\times10^5 \tag{4}$$

This property number is a parameter which indicates flexibility of the formation or the program in an analog computer or hybrid computer in which the sample and hold system is used. For example, in a hybrid computer wherein a distributor comprising sample and hold systems is used and output from a digital computer is supplied to an analog computer through a D–A converter and the distributor, a greater property number, that is, a higher ratio of $T_H/T_S$ generally increases the operating speed of the whole system and improves the data holding property of the system, thus minimizing the operator's trouble for considering the operating time of sample and hold elements.

Summary of the invention

An object of this invention is to improve the above-mentioned property number remarkably, for example, by a order of $10^3$ times. Particularly, this invention intends to shorten the sample time while increasing the hold time, by providing separate capacitors for each of the sample and hold functions. Assuming that the capacitors for sampling and holding have capacitances $C_1$ and $C_2$ respectively, $$T_S=\frac{2C_1E}{I_0} \quad (5)$$

$$T_H=\frac{C_2\cdot\Delta E}{I_1} \quad (6)$$

Thus, the property number is:

$$\frac{T_H}{T_S}=\frac{C_2}{C_1}\cdot\frac{I_0}{I_1}\cdot\frac{\Delta E}{2E} \quad (7)$$

As is seen from the above formula, the property number depends upon the ratio of $C_2$ and $C_1$. Accordingly, it will be obvious that the property number can be improved as desired, by selecting the values of $C_1$ and $C_2$. Thus, according to this invention are provided an improved sample and hold system as described in detail hereinafter with reference to the attached drawings.

Brief description of the drawings

FIG. 8 shows wave-forms of control signals.

FIG. 9 shows an example of the circuits for generating the control signals shown in FIG. 8.

Description of the preferred embodiments

Figure 1:
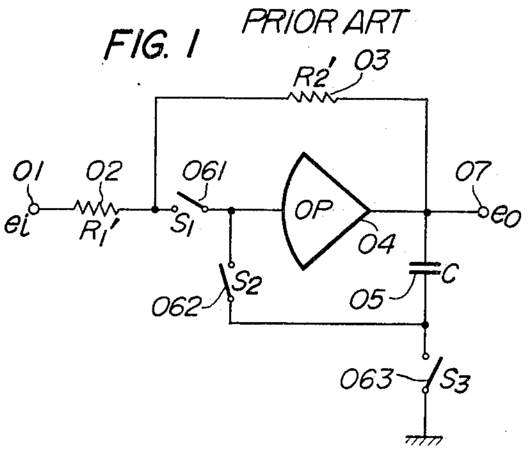
FIG. 1 is a schematic diagram of a known sample and hold system.
Figure 2:
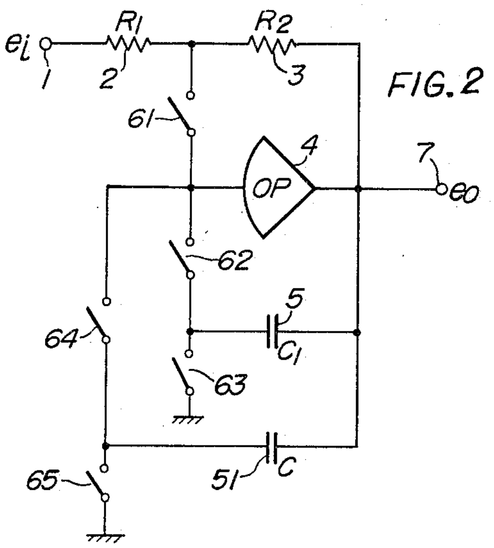
FIG. 2 is a diagram showing an embodiment of this invention.

Now, referring to FIG. 2 which shows an embodiment of a sample and hold system according to this invention; numeral 4 indicates an operational amplifier OP; 2 and 3 are respectively input and feedback resistors of the operational amplifier, values of the resistors being $R_1$ and $R_2$ respectively; numeral 5 is a sampling capacitor for the input signal $e_i$, static capacitance of the capacitor being $C_1$; and numeral 51 indicates a hold capacitor which has a static capacitance of $C_2$ and holds the voltage supplied from the sampling capacitor 5. The capacitors 5 and 51 are connected in parallel to the operational amplifier 4 through the switches 62 and 64 and to the ground through the switches 63 and 65. With such an arrangement, a sampling operation is performed by closing the switches 61 and 63 and opening the switches 62, 64 and 65. In the figure, the marks $S_1 \ldots S_5$ attached to the switches correspond to the control signals shown in FIG. 3 to be applied to the respective switches. Transfer of the voltage from the capacitor 5 to the capacitor 51 is attained by closing the switches 62 and 65 and opening the switches 61, 63 and 64. A hold operation is carried on in a state that the switches 62 and 64 are closed while the switches 61, 63 and 65 are opened. If the capacitance $C_2$ of the capacitor 51 is selected to be sufficiently large compared with the capacitance $C_1$ of the capacitor 5, a high sampling speed and a long hold time can be obtained.

Figure 3:
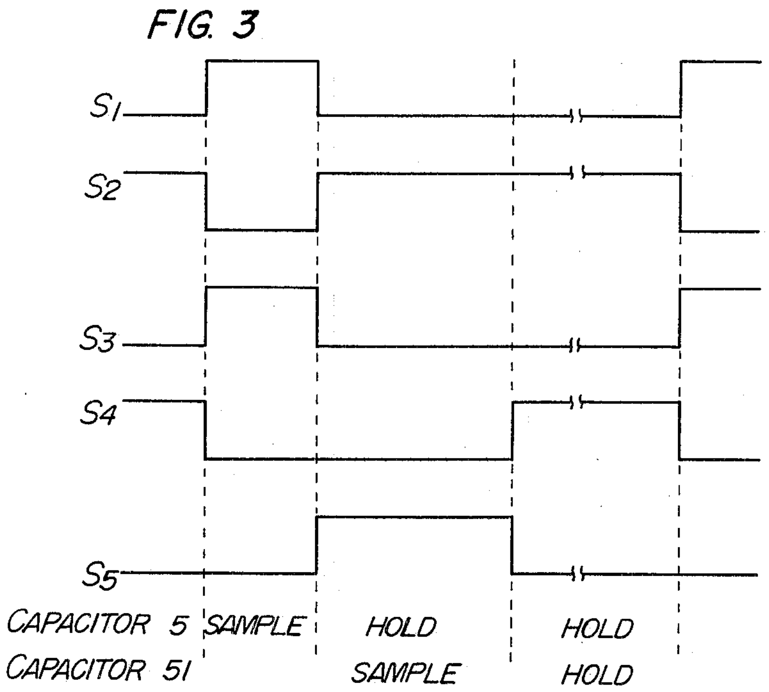
FIG. 3 shows wave-forms of control signals given to the switches in the system shown in FIG. 2.

Wave-forms of the control signals to the respective switches are shown in FIG. 3. The switches 61 and 63 are controlled by the associated signals to turn on during the sampling times, as these switches are used exclusively for the sampling operation. The switch 62 is controlled to turn on when the capacitor 51 is being charged (that is, during the sample time) and also during the hold time for the sampled voltage. The switch 64 is turned on by the associated signal during the hold time when the voltage charged in the capacitor 51 is held. The switch 65 is controlled to turn on when the capacitor 51 is charged by electricity from the capacitor 5. The sample and hold sequences in the capacitors 5 and 51 will be clear from FIG. 3. Hereunder, structure of the sample and hold system will be explained as for the respective functions separately.

Figures 4, 5A, 5B, 7:
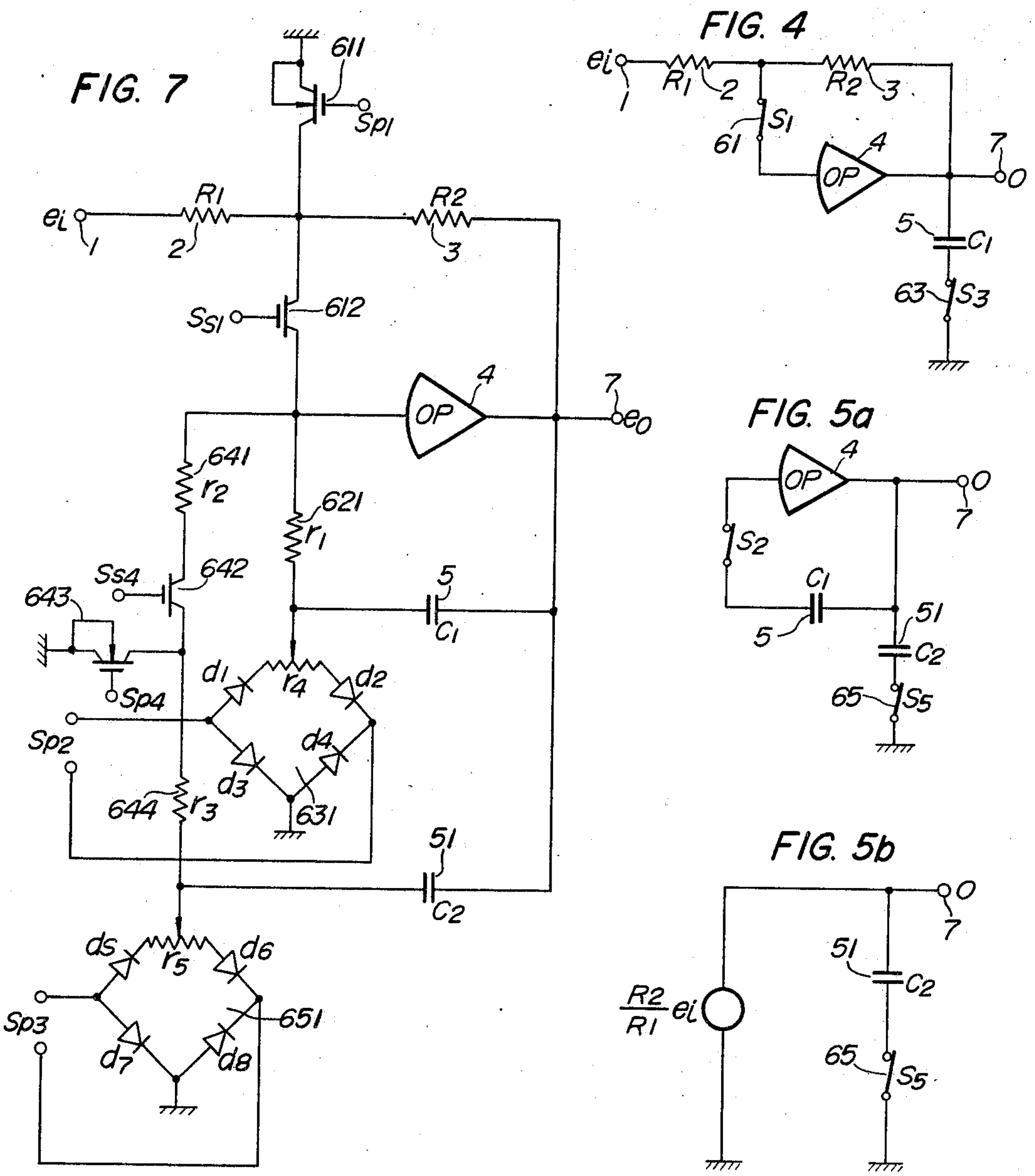
FIGS. 4, *5a*, *5b* and 6 are portions of the system of FIG. 2 as separated according to the respective functions.
FIG. 7 is a more practical presentation of the embodiment of this invention in which semiconductor switches are used.

In FIG. 4 which shows the sample circuit for charging the capacitor 5 (that is, sampling by the capacitor 5), the circuit composed with the input resistor 2, the feedback resistor 3 and the operational amplifier 4, serves to make the terminal voltage of the capacitor 5 to rapidly follow $-e_i\cdot R_2/R_1$ through the conducting switch 63. Thus, the sampling operation with this circuit is performed by providing the capacitor 5 with an electric current determined by the current limitation or conductive resistivity of the switch 63, the latter resistivity being in a range of approximately 10 to 20 ohms. The capacitor 5 is charged in a manner as mentioned above to the ultimate voltage of $$-\frac{R_2}{R_1}e_i$$

FIGS. *5a* and *5b* show the charge circuit for the capacitor 51 and the equivalent circuit thereof respectively. In FIG. *5a*, the parallel connected circuit of the capacitor 5 and the operational amplifier 4 is assumed to constitute a voltage source for charging the capacitor 51. This voltage source is a constant voltage supply which does not vary the output voltage regardless of load. That is, if the output voltage of the assumed voltage source tends to vary as the load varies, the increment or decrement is fed back to the input of the operational amplifier 4 through the capacitor 5, an increment being fed in the positive direction while a decrement in the negative direction. Such increment or decrement fed back to the input is amplified in reversed polarity through the operational amplifier 4 and appears at the output terminal. Accordingly, so far as the opeartional amplifier operates with linear characteristics, the voltage variation at the output is cancelled at every instant; and a constant voltage is supplied from said assumed voltage source to the capacitor 51. Thus, the circuit shown in FIG. *5a* can be represented by the equivalent circuit shown in FIG. *5b*, if the capacitor 51 is assumed to be charged from a constant voltage source as mentioned above. As is seen from FIG. *5b*, the output terminal 7 is kept at a constant voltage regardless of the charging current to the capacitor 51, in other words, regardless of the charging period determined by the time constant of the circuit. The charging current to the capacitor 51 is determined by the product of the conducting resistance of the switch 65 and the capacitance of the capacitor 51. A lower conducting resistance of the switch 65 presents a larger charging current. A large charging current increases the inner current of the operational amplifier 4 through the capacitor 5. As mentioned before, the operational amplifier 4 has two types of operating state, one being the saturated state (i.e., non-linear state) and the other being the unsaturated state (i.e., linear state). If the conducting resistance of the switch 65 is sufficiently low, the operational amplifier 4 operates in the saturated state. In such a state of the operational amplifier 4, the charging current to the capacitor 5 through the operational amplifier 4 cannot follow the variation in output voltage (or load current). Consequently, it takes a longer time to charge the capacitor 51 to full voltage. Moreover, the circuit consisting of the operational amplifier 4 and the capacitor 5 cannot provide a constant voltage. Therefore, it is necessary to prevent the operational amplifier from operating in a saturated range. For this purpose, the switch 65 should be endowed with current limitation. One example of such a switch is the one utilizing a diode bridge.

Figure 6:
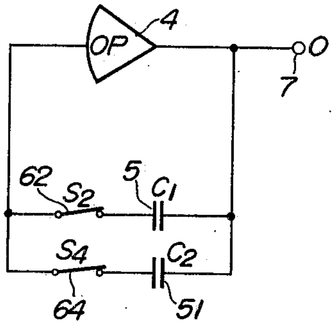

FIG. 6 shows a circuit representing the hold state. As described in connection with FIG. 5, the capacitors 5 and 51 connected in parallel to the operational amplifier 4, have a constant voltage $$-\frac{R_2}{R_1}e_i$$

In this hold circuit, the hold time depends on the total capacity of the capacitors 5 and 51. Therefore, it will be obvious that such a circuit presents a remarkably improved hold time compared with that of the known system.

With the conditions considered in connection with Formula 4, the sample time $T_S$, hold time $T_H$ and the property number $T_H/T_S$ of the system of this invention will be compared with those of the known system in the following Table 1. Values of the constituting elements are assumed so that C (the capacitor 5) in the known system is 3,000 pf. or 5 $\mu$f. (two examples) and that $C_1$ and $C_2$ (the capacitor 5 and 51) are 3,000 pf. and 5 $\mu$f. respectively.

TABLE 1

| | | $T_S$ ($\mu$sec.) | $T_H$ (sec.) | $T_H/T_S$ |
|---|---|---|---|---|
| Known system | C=3,000 pf | 2.4 | 0.6 | $5\times10^5$ |
| Do | C=5 $\mu$f | 4,000 | 1,000 | $5\times10^5$ |
| Present system | $C_1$=3,000 pf, $C_2$=5 $\mu$f | 2.4 | 1,000 | $8,000\times10^5$ |

When $E$=10 v. $\Delta E$=10 mv.

In the above table, ratio of the input voltage E and the maximum allowable deviation $\Delta$E of the output voltage is 0.001. In other words, voltage variation in a range of 0.1% of the input voltage has been considered to be allowable. It will be obvious from the above table that the property number of the system according to this invention is more than a thousand times as high as that of the known system. Further, in the present system, the property number can be selected as desired by appropriate selection of values of the capacitors.

FIG. 7 is a more practical connection diagram of the embodiment of this invention, and FIG. 8 is a diagram showing wave-forms of the control signals to be supplied to the respective switches. In FIG. 7, the FET (field effect transistor) switches 611 and 612 correspond to the switch 61 shown in FIG. 2. Similarly, the resistor 621 corresponds to the switch 62, the diode bridge switch 631 to the switch 63, the FET switches 642 and 643 to the switch 64, and the diode bridge switch 651 to the switch 65. It will be noted that the resistor 621 is used in place of a switch. The resistors 641 and 644 are protecting resistors. In the diode bridge switches 631 and 651, marks $d_1$ to $d_8$ indicate diodes and $r_4$ and $r_5$ are voltage dividing resistors. The other numerals or marks indicate the similar elements of corresponding numerals or marks in FIG. 2. Further, in FIG. 7, the switch 611 is used for protecting the switch 612, and the switch 643 protects the switch 642. That is, the switch 611 acts to short-circuit the input signal $e_i$ when the switch 612 has been turned off, and the switch 643 short-circuits the signal transmitted through the resistor 644 when the switch 642 is turned off. The voltage dividing resistors $r_4$ and $r_5$ which are semi-variable resistors and can be manually set at the desired position, are used for correcting an unbalance of the bridges caused by non-uniformity in characteristics of the diodes in the respective bridges. The protecting resistor 641 serves to remove spike pulses which may be produced when the switch 642 operates. The protecting resistor 644 is provided to minimize the voltage produced by the capacitor 51. In the following paragraph, the function of the resistor 621 which is used in lieu of the switch 62, will be explained.

During the sampling time, the input and output signals are related to each other as represented by the following formula:

$$e_0 = -\frac{1+SC_1r_0}{1+SC_1r_0\left(1+\frac{R}{r_1}\right)}e_i$$

where $R_1=R_2=R$, $r_0$ is the conducting resistance of the switch 631, and S is the Laplacian operator.

In the above formula, a term related to the value of resistor 621 is $$SC_1r_0\left(1+\frac{R}{r_1}\right)$$

in the denominator. This term is related to a delay in rise time. The delay time is indicated by $$C_1r_0\left(1+\frac{R}{r_1}\right)$$

Generally, the value of $r_0$ is sufficiently small except when $r_1$ is extremely small compared with R. Accordingly, the above-mentioned delay time is almost negligible. Therefore, it is only required for practical purposes to choose $r_1$ so that $r_1$ is not smaller than R. It will be understood that the value of the output voltage $e_0$ ultimately converged is not related to $r_1$, but is equal to the input signal $e_i$. On the other hand, during the hold time, the resistor 621 is required only to connect the capacitor 5 to the input of the operational amplifier, whatever value the resistor has. However, if a certain noise signal will be applied to the input of the operational amplifier (usually, called a summing point) from outside, a noise signal related to the product of the noise input and the feedback impedance will appear at the output terminal (a known fact). Therefore, the resistor 621 ($r_1$) should not be set at too high a value. It will be safe if $r_1$ is set to be nearly equal to R. Markings $S_{P1}$, $S_{S1}$, $S_{P2}$, $S_{P3}$, $S_{P4}$ and $S_{S4}$ indicate the control signals shown in FIG. 8 which are associated with the respective switches.

Now, the operation of the system shown in FIG. 7 will be explained with the aid of FIG. 8. A FET switch of N channel type is turned on or off in response to a positive or negative gate signal respectively, while a FET switch of P channel type operates in opposite relation to the polarity of the gate signal. However, as there is no essential difference between the two, it is assumed in the following explanation that FET switches of P channel type are used in this embodiment.

Assuming that a sample signal $T_r$ is applied at the instant $t_1$ as shown in FIG. 8, control signals of respectively negative and positive polarity are applied in reversed phase to the switches 611 and 612, thereby turning the switch 611 to off-state and the switch 612 to on-state. Further, the switches 631 and 643 also are caused to conduct by the positive control signal, while the switches 642 and 651 are turned off by a negative control signal. With the switches thus controlled by respective control signals, the capacitor 5 is charged with the input signal $e_i$. Though the capacitor 51 may seem also to be charged through the switch 643, the charging of the capacitor 51 can be neglected as compared with the charging of the capacitor 5, as the protecting resistor 644 has sufficiently high resistance compared with the conducting resistance of the diode bridge switch 631. A diode bridge switch operates in the following manner. When a positive control signal is applied to a pair of control signal input terminals of the bridge (that is, the control signal is applied in forward direction), the diodes $d_1$ to $d_4$ become conductive. With all diodes being conducting, resistance of the bridge between the other pair of terminals is reduced to a low value which corresponds to the conducting resistance of the diodes. The switch is turned off when a negative control signal is applied to the control signal input terminal.

The time required to charge the capacitor 5 is determined by the capacitance of the capacitor 5 and the current limiting characteristics of the switch 631, as explained in connection with FIG. 4. Upon completion of the charging of the capacitor 5 at the time $t_2$, charging from the capacitor 5 to the capacitor 51 starts. This charging of the capacitor 51 is performed by controlling the switches 611 and 651 to conduct while the switches 612 and 631 are controlled not to conduct. That is, the switches 611 and 651 are given a positive control signal, while the switches 612 and 631 a negative control signal. The switches 612 and 631 are controlled as described in connection with the charging of the capacitor 5. Though the charging current to the capacitor 51 may seem to be divided between the switches 643 and 651, this time again, the charging current can be asusmed to flow only through the switch 651 for practical purposes, as the protecting resistor 644 has sufficiently high resistance compared with the conducting resistance of the diode bridge switch 651. While, the resistor 621 acts practically as a switch, as its resistance is sufficiently low compared with the non-conducting resistance of the diode bridge switch 631. The charging time of the capacitor 51 is determined by the capacitance of the capacitor 51 and the current limiting characteristics of the switch 651 as explained in connection with FIG. 4.

Upon completion of the charging of the capacitor 51, the control signal for the switches 651 and 643 changes the polarity from negative to positive, while the control signal for the switch 642 from positive to negative. Consequently, the capacitors 5 and 51 are turned to hold state. The hold state is maintained until the next "sample" instruction is received; and upon reception of the "sample" instruction, the switches are controlled sequentially as described above to sample the new input for the capacitor 5. In FIG. 8, it will be noted that the control signal for the switch 631 has a pulse width narrower by $UV_1'$ than that for the switches 612, 611 and 651. This is to prevent the stored electricity in the capacitor 5 from leaking through the switch 631 if the switches 611, 612, 631 and 651 are switched simultaneously. Thus, a first-order lag is attained by turning off the switch 631 earlier by the pulse width $UV_1'$, in the switching of the sampling operation from the capacitor 5 to the capacitor 51. This new feature of a first-order lag contributes to the high accuracy in the sampling characteristics of the system of this invention.

In the above embodiment, the resistor 621 is used in place of a switch because of more simplification of the circuit. It should be noted that use of the resistor 621 instead of a switch is not inevitable but optional. Likewise, the protection resistors 641 and 644 are not indispensable, as they are required only when the potential at the summing point must be maintained strictly at a determined level. Further, it will be obvious that the FET switches can be substituted by electronic switches of another type.

FIG. 9 is an example of the control circuits for generating the control signals shown in FIG. 8. In FIG. 9, reference numeral 82 to 84 indicate monostable multivibrators, 86 to 88 inverters, 86 OR-gate and 89 AND-gate. The monostable multivibrators 82, 83 and 84 have time constants with which are generated pulse signals having a width $UV_1$, $UV_1'$ and $UV_2$ respectively. Further, the monostable multivibrator 83 is set so that it is triggered by the fall of the output signal.

Figure 10:
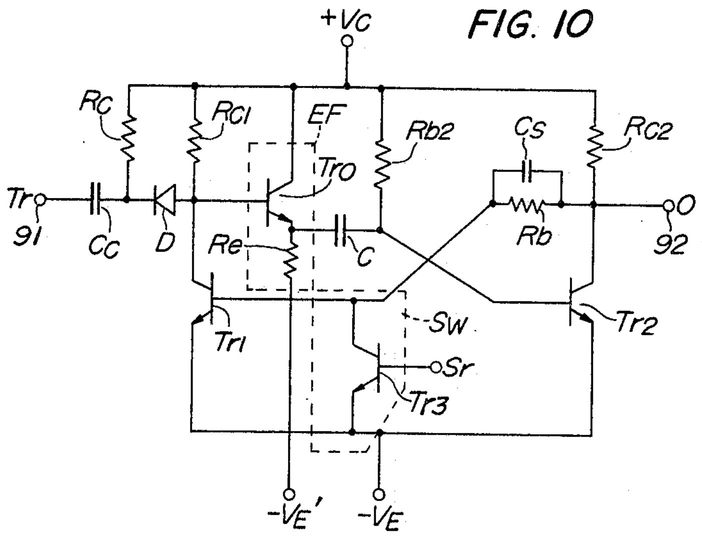
FIGS. 10 and 11 show improved circuits relating to the circuit shown in FIG. 9.

Now, operation of the control circuit of the above-mentioned constitution will be explained hereunder. When a negative trigger input $T_r$ is applied to the monostable multivibrators 82 and 84, the multivibrator 82 generates a positive pulse signal having a width of $UV_1$. Similarly, the multivibrator 84 also generates a positive pulse signal having a width of $UV_2$. The positive pulse signal from the multivibrator 82 is supplied to the sample and hold system to control the switch 631 and also to the multivibrator 83 as the latter's input signal. As the multivibrator 83 is triggered by the fall of the output from the multivibrator 82, the output signal of the multivibrator 83 generates a positive pulse signal concurrently with the fall of the output signal of the multivibrator 82. Then, output signals from the multivibrators 82 and 83 are supplied to the OR-gate 85 to make a logic sum. The signal from the OR-gate is applied to the switch 612 of the sample and hold system, and at the same time, the signal is given also to the switch 611 after being inverted by the inverter 86. The output signal from the third multivibrator 84 is used to control the switch 642 after being inverted by the inverter 87. The inverted signal from the inverter 87 is applied to the switch 643 after being inverted once again through the inverter 88. The output from the inverter 88 is also led to one of the inputs of the AND-gate 89 whose other input is the output of the inverter 86. The output from the AND-gate 89 is supplied to the switch 651 as control signal. With such an arrangement, the control signals as shown in FIG. 8 can be obtained without any special difficulty. The monostable multivibrators 82, 83 and 84 shown in FIG. 9 are nothing else but conventional ones. However, it should be noted that such a multivibrator may sometimes fail to respond to the trigger input, that is, the sample instruction, if the input is too frequent. That is, the control circuit described in connection with FIG. 9 has a disadvantage in that it cannot follow sample instructions which are given with very short intervals. Referring to FIG. 8, as the control signal to the switch 643 is defined by the time constant of the multivibrator 84, a trigger signal or a sample instruction applied when the multivibrator is generating an output signal of width $UV_2$, cannot be an effective input. In order to remove such a disadvantage, it is only required to reset the multivibrator 83 rapidly by the trigger signal while it is generating an output signal of width $UV_2$. FIG. 10 shows one of such arrangements.

In FIG. 10, the circuit elements to reset the monostable multivibrator rapidly by the trigger signal applied to the input terminal 91, are shown in the areas enclosed by dash lines. The portion indicated as EF is an emitter follower circuit consisting of transistor $T_{r0}$, and emitter resistor $R_e$, and the portion indicated as $S_w$ is a switching circuit to link the base and emitter of transistor $T_{r1}$, the transistor $T_{r3}$ being turned on by the positive reset signal $S_r$. The other circuit elements are similar to those found in a conventional monostable multivibrator. Namely, capacitor $C_c$ and resistor $R_c$ constitute a differential circuit to differentiate the trigger input signal $T_r$. Resistor $R_{b2}$ is a bias resistor. Diode D is inserted to pass only the fall of the trigger signal $T_r$. Resistors $R_{c1}$ and $R_{c2}$ are connected to the collectors of transistors $T_{r1}$ and $T_{r2}$ respectively. Resistor $R_b$ is connected to the base of transistor $T_{r1}$. Capacitor $C_s$ connected across the resistor $R_b$ serves as a speed-up capacitor. The power source having a voltage of $+V_c$ (not shown) is connected to the terminal marked $+V_c$ to supply power to collectors, and other power sources of voltage $-V_E$ and $-V_E'$ (also not shown) are connected to the terminals marked $-V_E$ and $-V_E'$ respectively. Hereunder, operation of the circuit shown in FIG. 10 will be explained, particularly in connection with the reset operation of the monostable multivibrator.

In a normal state of the multivibrator when no trigger signal is present at the input, the voltage $+V_c$ is applied to the base of transistor $T_{r2}$ through the base resistor $R_{b2}$. Accordingly, the transistor $T_{r2}$ becomes conductive to give a continuous output of a negative signal. The value of voltage $V_E'$ is determined so that the transistor $T_{r0}$ operates always as an emitter follower. With the transistors $T_{r0}$ and $T_{r2}$ being thus conducting, the capacitor C is charged with a time constant determined by the capacitance of the capacitor and the sum of the output resistance of the emitter follower and the input resistance of the transistor $T_{r2}$. The time required for the charge of the capacitor C is considerably short because of the relatively low resistance in the circuit.

Upon application of a negative trigger signal $T_r$, a negative voltage is introduced at the cathode of the diode through the capacitor $C_c$. This negative voltage makes the diode conductive, thereby lowering the potential at the collector of the transistor $T_{r1}$. This negative-going change in the collector level causes a change in the output of the emitter follower, which in turn is applied to the base of the transistor $T_{r2}$ through the capacitor C, thereby turning off the transistor $T_{r2}$. With the transistor $T_{r2}$ being turned off, the output voltage approaches the collector voltage $V_c$. This voltage is applied to the base of the transistor $T_{r1}$ through the resistor $R_b$ to turn on the transistor $T_{r1}$. Such a state wherein the transistor $T_{r1}$ is conductive while the transistor $T_{r2}$ is non-conductive, corresponds to the period when the multivibrator is producing a positive output signal of $V_c$ which is the source voltage. This positive output (that is, generation of pulse) continues until the voltage of the capacitor C has been discharged through the output resistor of the emitter follower, the capacitor C and the bias resistor $R_{b2}$ and the transistor $T_{r2}$ is biased in forward direction. The time required for discharging the capacitor C is determined by the time constant which consists of the capacitor C and the resistor $R_{b2}$. Thus produced output signal is given to the switch 643 as a control signal. The discharge of the capacitor C cannot be stopped by a new trigger signal if it has been started once. To solve this problem, the transistor switch *Sw* is used. If the switch *Sw* is used the switch *Sw* receives a positive pulse signal *Sr* (that is, a sample signal) in synchronization with the trigger signal $T_r$, the transistor $T_{r3}$ is turned on and the base potential of the transistor $T_{r1}$ rapidly approaches the emitter potential $-V_E$. Consequently, the transistor $T_{r1}$ is instantly switched from conductive state to non-conductive state, no bias being applied to the transistor. With the transistor $T_{r1}$ being turned off, the source voltage $+V_c$ is applied to the base of the transistor $T_{r2}$, thereby making the transistor $T_{r2}$ conductive once again. According to the above-described sequence of operation, the monostable multivibrator 83 can be reset regardless of the time constant, rapidly resetting the capacitor C to the initial state of voltage. It will be noted that the positive pulse signal to the switch *Sw* can be readily obtained by introducing the sample instruction through a phase inverting circuit.

Figure 11:
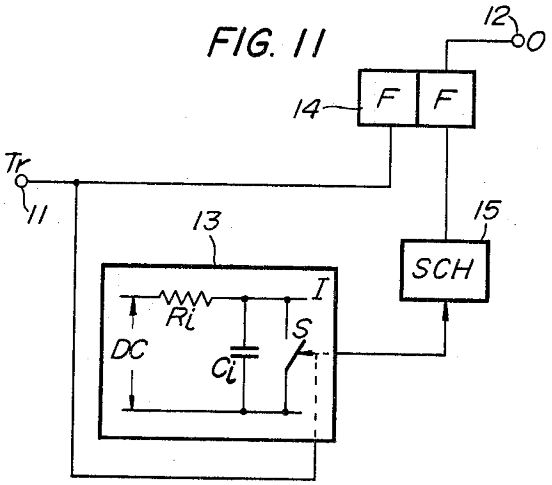

The monostable multivibrator 84 shown in FIG. 9 provides a pulse output of a predetermined width in response to the trigger signal. FIG. 11 is another example of pulse generating circuits. In FIG. 11, the trigger signal $T_r$ applied to the input terminal 11 resets the flip-flop 14 and also the integrator 13. The switch S connected across the output of the integrator 13 is normally open, except when it is closed by the trigger signal. Accordingly, it integrates to the DC voltage by the resistor $R_i$ and the capacitor $C_i$ after the switch S has been opened. Therefore, if the Schmitt circuit 15 connected to the integrator 13 is set at a predetermined conducting level, it will supply a set signal to the flip-flop 14 whenever a predetermined time has elapsed after occurrence of the trigger signal. As the integrator is reset each time it receives a sample instruction, the flip-flop 14 is set by the above-mentioned set pulse at the predetermined time after every new sample instruction. If said predetermined time is chosen to correspond to the pulse width $UV_2$, this circuit will act in the same manner as the multivibrator 84 described in connection with FIG. 9.

The above description relating to the multivibrator 84 applies also to the multivibrator 82. It is always possible to replace a monostable multivibrator by a timing circuit, as shown in FIG. 10 or FIG. 11, which can be reset.

Figure 12:
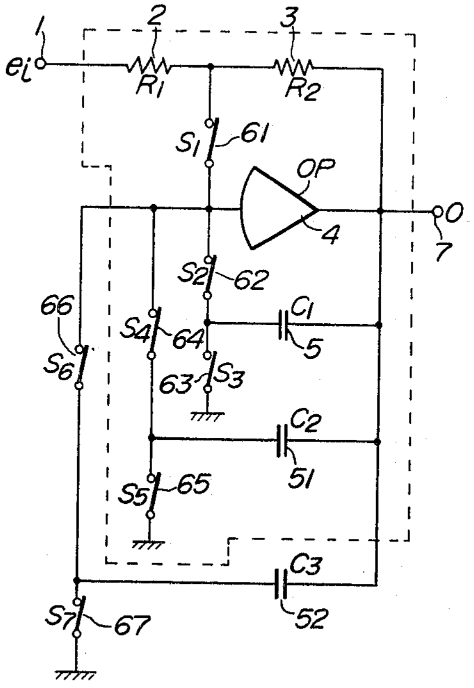
FIG. 12 shows another embodiment of this invention.

FIG. 12 shows another embodiment of this invention which has a further improved property number. In the figure, the circuit within the enclosure of the dash lines is the same as that shown in FIG. 2. The same reference numbers and marks indicate the corresponding circuit elements in both figures. The corresponding switches are controlled also in the same manner as in the previously described circuit. In this embodiment, a third capacitor 52 has been introduced. The capacitor 52 is connected to the previous circuit through the switches 66 and 67. With this arrangement, the sample voltage of the capacitors 5 and 51 is charged also to the third capacitor 52. During the charging, the output signal is kept at a constant voltage level, as the circuit consisting of the operational amplifier and the capacitors 5 and 51 constitutes a constant voltage power source. The hold time is further extended with the charged capacitor 52. It will be obvious that the property number of the sample and hold system can be readily improved by such arrangement. It will be also clear that the further addition of a capacitor or capacitors is possible.

If different capacitances of capacitors are used for the capacitors 5, 51 and 52, the capacitor 5 being the smallest and 52 the largest, the object of this invention will be fully attained. However, within the scope of this invention, the capacitances of the respective capacitors will not be limited to particular values. The capacitances should be determined depending on the purposes of use, requirements of operation and other various conditions under which the system of this invention is to be used.

As described in the preceding paragraphs, according to this invention, a sample and hold system whose property number $T_H/T_S$ is more than a thousand times as high as that of the known system, has been obtained. With a sample and hold system of such excellent property, a computing system can now enjoy high versatility, composition of the system and programming being easy. With a conventional system, satisfactory hold characteristics are inevitably associated with longer sample time. Therefore, design of the system could be achieved by a compromise between accuracy and speed. Such disadvantage has been eliminated by the system of this invention. The sample and hold system of this invention is most suitable for the various devices related to the computers that require high accuracy and high speed. The system of this invention is also suitable for an input device of an A–D converter and for an output device of a computer control.

We claim:

1. A sample and hold system comprising in operational amplifier; a terminal (hereafter, referred to as an SH terminal) to which the signal to be sampled and held (hereafter, referred to as an SH signal) is applied; a feedback resistor one terminal of which is connected to the output terminal of said operational amplifier and the other terminal of which is connected to said SH terminal; first switch means for selectively connecting the joining point of said other terminal of said feedback resistor and said SH terminal to the input terminal of said operational amplifier; at least first and second capacitors, one terminal of each being connected to said output terminal of said operational amplifier; second switch means for selectively connecting the other terminal of each of said capacitors either to the ground or to said input terminal of said operational amplifier; means for driving said first switch means so that said joining point is connected to said input terminal of said operational amplifier and at the same time, driving said second switch means so that said other terminal of said first capacitor is grounded and said other terminal of said second capacitor is disconnected, during the time in which said SH signal is sufficiently stored in said first capacitor; means for driving said first switch means so as to disconnect said joining point from said input terminal of said operational amplifier after completion of storage of said SH signal in said first capacitor; means for driving said second switch means so as to connect said other terminal of said first capacitor to said input of said operational amplifier, and at the same time, so as to connect said other terminal of said second capacitor to the ground during the time sufficient to charge said second capacitor with the signal stored in said first capacitor; and means for driving said second switch means so as to connect said other terminal of said second capacitor to said input terminal of said operational amplifier after completion of storage of the signal into said second capacitor; thereby said SH signal being sufficiently held in said first and second capacitors and decrease of said SH signal stored in said first and second capacitors being compensate by the output from said operational amplifier.

2. A sample and hold system as defined in claim 1, wherein the capacitance of said first capacitor is smaller than that of said second capacitor.

3. A sample and hold system comprising an operational amplifier; a terminal (hereafter, referred to as an SH terminal) to which the signal to be sampled and held (hereafter, referred to as an SH signal) is applied; a feedback resistor one terminal of which is connected to the output terminal of said operational amplifier and the other terminal of which is connected to said SH terminal; first switch means for selectively connecting the joining point of said other terminal of said feedback resistor and said SH terminal to the input terminal of said operational amplifier; first, second and third capacitors, one terminal of each being connected to said output terminal of said operational amplifier; second switch means for selectively connecting the other terminal of each of said capacitors either to the ground or to said input terminal of said operational amplifier; means for driving said first switch means so that said joining point is connected to said input terminal of said operational amplifier and at the same time, driving said second switch means so that said other terminal of said first capacitor is grounded and said other terminals of said second and third capacitors are disconnected, during the time in which said SH signal is sufficiently stored in said first capacitor; means for driving said first switch means so as to disconnect said joining point from said input terminal of said operational amplifier after completion of storage of said SH signal in said first capacitor; means for driving said second switch means so as to connect said other terminal of said first capacitor to said input of said operational amplifier, and at the same time, so as to connect said other terminal of said second capacitor to the ground during the time sufficient to charge said second capacitor with the signal stored in said first capacitor; means for driving said second switch means so as to connect said other terminal of said third capacitor to the ground during the time sufficient to charge said third capacitor with the signal stored in said first and second capacitors; and means for driving said second switch means so as to connect said other terminal of said third capacitor to said input terminal of said operational amplifier after completion of storage of the signal into said third capacitor; thereby said SH signal being sufficiently held in said first, second and third capacitors and decrease of said SH signal stored in said first, second and third capacitors being compensated by the output from said operational amplifier.

References Cited

UNITED STATES PATENTS

| | | | |
|---|---|---|---|
| 3,249,925 | 5/1966 | Single et al. | 340—173 |
| 3,304,507 | 2/1967 | Weekes et al. | 328—151 |

BERNARD KONICK, Primary Examiner

J. F. BREIMAYER, Assistant Examiner

U.S. Cl. X.R.

235—183; 328—151